Jan. 1, 1929.
A. J. RUBIN
1,697,024
ELECTRIC TOASTER
Filed July 31, 1928
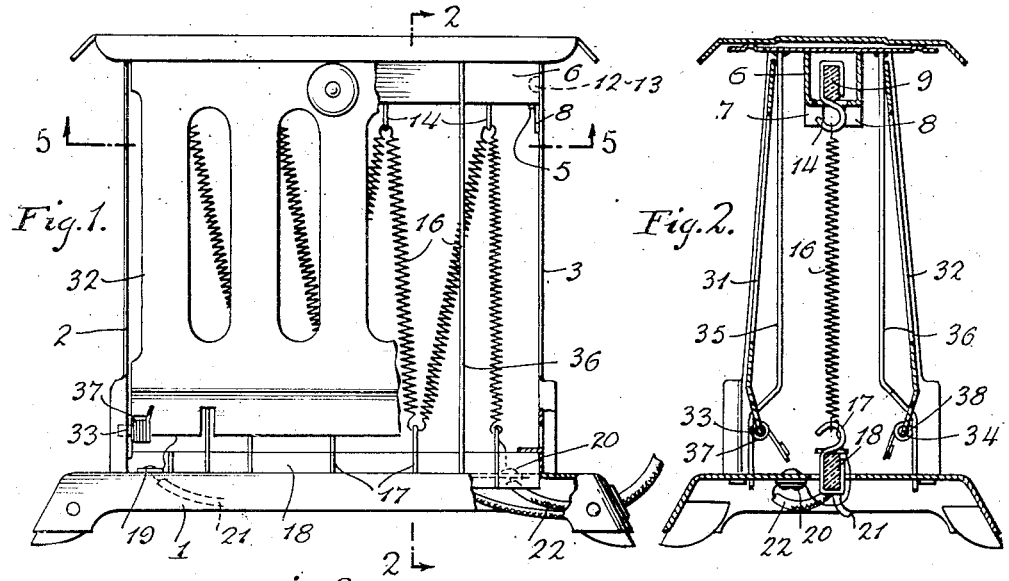
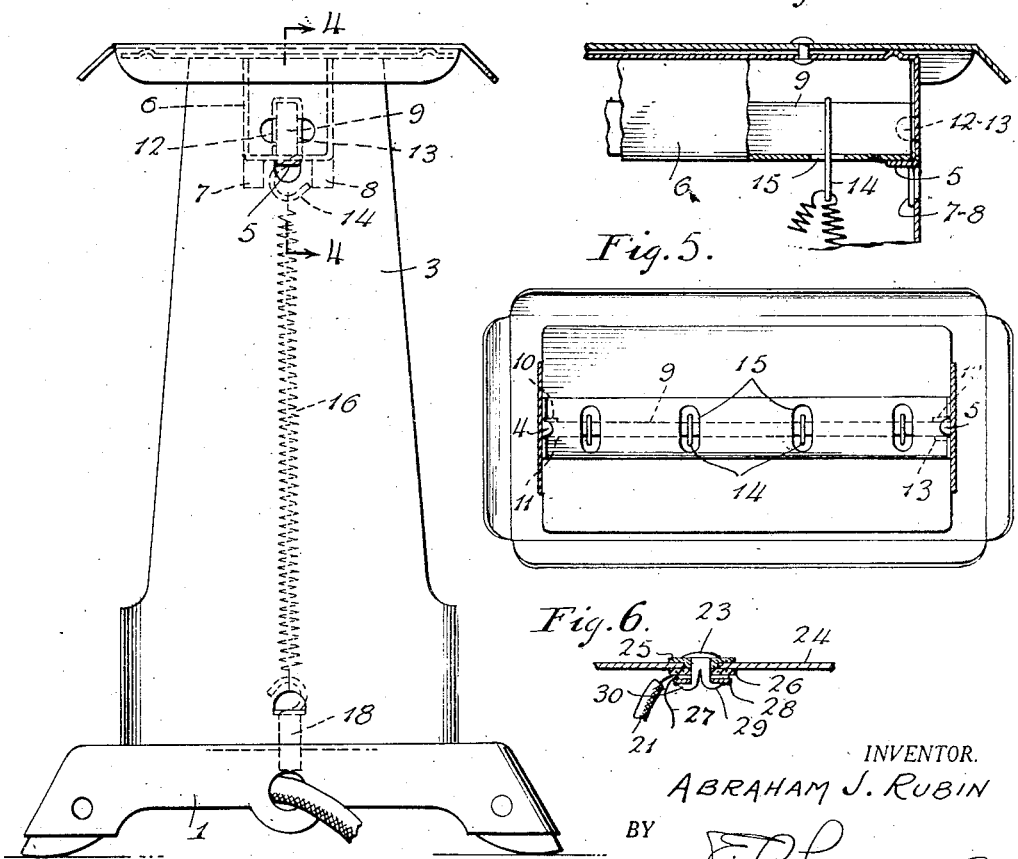
INVENTOR.
ABRAHAM J. RUBIN
BY
ATTORNEY.

Patented Jan. 1, 1929.

1,697,024

UNITED STATES PATENT OFFICE.

ABRAHAM J. RUBIN, OF NEW YORK, N. Y., ASSIGNOR OF ONE-THIRD TO NATHAN S. GOLDSTEIN AND ONE-THIRD TO LAWRENCE S. HELLER, BOTH OF NEW YORK, N. Y.

ELECTRIC TOASTER.

Application filed July 31, 1928. Serial No. 296,527.

This invention relates to electric toasters, particularly of the type used for domestic purposes and cperated by house current. One object of my invention is to provide a toaster of a simplified construction that can be produced at a low cost of manufacture. Another object of my invention is to provide a toaster that will uniformly heat the article to be toasted throughout its entire area.

Referring to the drawings,

Figure 1 is a front and partial sectional elevation of the toaster.

Figure 2 is a section of the toaster shown in Figure 1 along the line 2—2.

Figure 3 is an end elevation of the invention.

Figure 4 is a fragmentary section along line 4—4 of Figure 3.

Figure 5 is a section along line 5—5 of Figure 1.

Figure 6 is a section of the electric terminal used in this device.

In the drawings, 1 represents the base of the toaster upon which are positioned the lateral supports 2 and 3 which constitute the sides of the toaster. These supports contain inwardly extending prongs 4 and 5 which support the channel 6, at the extremities of which are the lugs 7 and 8 which abut against the inner surfaces of said supports. The bar 9 is composed of some insulating material, such as asbestos; and this bar rests upon and is supported by said channel 6, the inwardly extending prongs 10, 11, 12, and 13 of the lateral supports 2 and 3 being arranged to hold said bar in position within the said channel.

Secured to said bar 9 are a plurality of electrically separated hooks 14 which extend through the perforations 15 in the base of the channel 6. A continuous electric heating element 16 is anchored upon and extends through the hooks 14 and the hooks 17 which are secured to another insulating bar 18 positioned at the base of the toaster, as shown. This electric heating element is so arranged as to alternately run from a hook on one bar to the nearest hook on the opposite bar. The ends of the element 16 are connected to the terminals 19 and 20, to which the leads 21 and 22, from the source of current supply, are electrically connected.

The said terminals 19 and 20 are each electrically insulated from the base, each of said terminals comprising a body portion or rivet 23 extending through a suitably positioned hole in member 24 of the toaster. This rivet is electrically separated from the body of the toaster by the flanged insulating washer 25 and the insulating washer 26. An extremity 27 of the element 16 and a lead 21 from the source of current supply are wound around the said rivet below the said washers, and are held in abutment with the washer 26 by a third washer 28 positioned over the end of said rivet and held in position by the upset ends 29 and 30 of said rivet.

The article to be toasted is held by the covers 31 and 32 which are mounted on the hinges 33 and 34 and held in their normally closed positions against the stops 35 and 36 by the springs 37 and 38.

The anchoring hooks 14 and 17 and the heating element 16 are so arranged that the said element will lie within the plane containing the bars 9 and 18, so that every part of the element 16 is practically equidistant from the surface of the article to be toasted, thereby insuring a uniform distribution of heat.

The use of the two parallel continuous strips or bars of insulating material 9 and 18, with the hooks secured thereon, is an important factor in the simplification of toaster design as effected by this invention, and constitutes an inexpensive method of providing a toaster with electrically insulated anchors for the heating element.

What I claim is:

1. In an electric toaster, a continuous bar of insulating material having separately secured thereon a plurality of hooks, each one of said hooks being looped around said bar and adapted to receive an electric heating element, the said hooks being so spaced along the length of said bar that no one of said hooks is in contact with any of the others.

2. In an electric toaster, two parallel bars of insulating material, each having separately wound thereon a plurality of hooks so spaced along the length of said bars that no one of said hooks is in contact with any of the other hooks; and one continuous electric heating element anchored on and extending through all of said hooks.

3. In an electric toaster, two parallel bars of insulating material, each bar extending through the loops of and supporting a plurality of hooks, so spaced along the length of said bars that no one of said hooks is in contact with any of the other hooks; and one continuous electric heating element anchored on all of said hooks and arranged in such manner as to alternately run from a hook on one bar to the nearest hook on the opposite bar.

4. In an electric toaster, two parallel bars of insulating material; a continuous electric heating element; electrically insulated terminals electrically connected to the ends of the said element; and anchoring means looped around said bars for supporting the said element in such manner that the element will lie in the plane containing the said bars.

5. In an electric toaster, two parallel bars of insulating material, each having separately wound and secured thereon a plurality of hooks so spaced along the length of said bars that no one of said hooks is in contact with any of the other hooks; one continuous electric heating element anchored on all of said hooks and arranged in such manner as to alternately run from a hook on one bar to the nearest hook on the opposite bar, the said heating element lying in the plane containing the said parallel bars; and electrically insulated terminals connected to the ends of said element.

6. In an electric toaster, a bar of insulating material having separately secured thereon a plurality of hooks adapted to receive and support an electric heating element, each of said hooks being looped around said bar; a channel bar containing the said bar of insulating material and positioned between two lateral supports constituting the sides of said toaster; one of the sides of the said channel containing a plurality of perforations adapted to permit the said hooks to extend therethrough.

7. In an electric toaster, a bar of insulating material adapted to receive a plurality of hooks for the support of an electric heating element; a channel bar containing said bar of insulating material and positioned between two lateral supports constituting the sides of said toaster; each of said supports containing a plurality of inwardly extending prongs, certain of said prongs being adapted to support said channel bar, the remaining prongs being arranged to hold the said bar of insulating material in its position on said channel bar.

8. In an electric toaster, two parallel bars of insulating material, each having separately secured thereon a plurality of hooks so spaced along the length of said bars that no one of said hooks is in contact with any of the other hooks; one continuous electric heating element anchored on and extending through all of said hooks; the extremities of said element being connected to two electrically insulated terminals; each of the said terminals comprising a rivet extending through a suitably positioned hole in the body of said toaster, the rivet being electrically separated from said body by a flanged insulating washer positioned over and extending into the said hole, and a second insulating washer positioned under said hole, the extremities of the element and the lead from the source of current supply being wound around the body of said rivet below the said washers and being held in abutment with said second washer by a third washer positioned over the end of said rivet and held in position by the upset split ends of said rivet.

In testimony whereof I affix my signature.

ABRAHAM J. RUBIN.